United States Patent

Walgers

[11] Patent Number: 5,546,106
[45] Date of Patent: Aug. 13, 1996

[54] INTERACTIVE IMAGE DISPLAY DEVICE WITH CURSOR CONTROL

[75] Inventor: Erik J. Walgers, Eindhoven, Netherlands

[73] Assignee: U.S. Philips Corporation, New York, N.Y.

[21] Appl. No.: 293,633

[22] Filed: Aug. 18, 1994

[30] Foreign Application Priority Data

Aug. 20, 1993 [BE] Belgium ............................... 09300849

[51] Int. Cl.⁶ ...................................................... G09G 5/00
[52] U.S. Cl. ............................................. 345/184; 345/157
[58] Field of Search ...................................... 345/184, 157, 345/156, 145, 160, 163, 167, 168, 169; 273/148 B; 74/471 XY, 471 R

[56] References Cited

U.S. PATENT DOCUMENTS

| 4,354,185 | 10/1982 | Worborschil | 345/145 |
| 4,764,763 | 8/1988 | Wickstead et al. | 345/184 |
| 4,975,689 | 12/1990 | Suzuki et al. | 345/184 |
| 5,387,925 | 2/1995 | Melling, Jr. et al. | 345/157 |

FOREIGN PATENT DOCUMENTS 2294687  12/1990  Japan .................................... 345/157

*Primary Examiner*—Jeffery Brier
*Assistant Examiner*—Xiao M. Wu

[57] ABSTRACT

An interactive image display device comprises cursor control means which, realize the movement of a cursor in a direction of a first and a second coordinate axis on the screen, respectively, in dependence on whether a control knob is rotated counter-clockwise or clockwise in order to change an adjustment.

10 Claims, 2 Drawing Sheets

1

INTERACTIVE IMAGE DISPLAY DEVICE WITH CURSOR CONTROL

BACKGROUND OF THE INVENTION

The invention relates to an interactive image display device, comprising a display screen and cursor control means for controlling a movement of a cursor on the screen.

A device of this kind is known from U.S. Pat. No. 4,764,763. The control means described in the cited publication comprise two rotatable knobs, one for controlling horizontal cursor movements and one for controlling vertical cursor movements. Also known are devices in which the cursor is controlled by means of a mouse. Two-dimensional movements of the mouse are then convened into two-dimensional movements of the cursor.

Interactive image display devices can be used, for example in a car to indicate locations on a map displayed on the screen. The driver of the car indicates a location on the map by moving the cursor to the corresponding location on the screen.

The known control means require two adjustment freedoms (two knobs in the case of the cited publication or a two-dimensionally movable mouse). For a variety of applications, for example for application in a car, however, it is desirable to realise two-dimensional cursor control while requiring a minimum of adjustment freedoms.

SUMMARY OF THE INVENTION

It is inter alia an object of the invention to provide an interactive image display device in which the number of adjustment freedoms required for two-dimensional control of cursor movements is reduced.

To achieve this, the interactive image display device in accordance with the invention is characterized in that the cursor control means are arranged to realise the movement of the cursor in a direction of a first or a second coordinate axis on the screen, depending on whether a change of adjustment of a control means has a first direction or an opposing second direction. The cursor position can thus be adjusted on a two-dimensional part of the screen while utilizing only one adjustment freedom in the control means.

An embodiment of the image display device in accordance with the invention is characterized in that the directions of the first and the second coordinate axis intersect at an angle of substantially 90 degrees. These cursor movements can be readily executed and are clear to the user. Different directions can be used for the coordinate axes in different locations on the screen.

An embodiment of the image display device in accordance with the invention is characterized in that the control means comprises a rotatable knob which is rotatable in mutually opposed directions for adjustment. A rotatable knob is particularly suitable for control with only one adjustment freedom.

During use of the image display device in accordance with the invention, only the part of the screen which is situated between the directions of the first and the second coordinate axis is directly accessible.

An embodiment of the image display device in accordance with the invention is characterized in that, viewed from the normal position of use, counter-clockwise and clockwise rotations of the knob correspond to movements of the cursor in the downwards direction and to the fight, respectively. When this choice is made, the area to the bottom fight of the cursor is directly accessible. This is the area in which in Western writing the part of a text to be read next is present, so that it is the location where the user intuitively searches a new cursor location first.

An embodiment of the image display device in accordance with the invention is characterized in that it is arranged to move the cursor, when it reaches a first point of intersection with a first boundary of a predetermined region on the screen during movement, to a second, other point of intersection on an opposite second boundary. Thus, more parts of the screen can be reached by continued movement of the control means.

A further embodiment of the image display device in accordance with the invention is characterized in that the second point of intersection is chosen so that the movement of the cursor is cyclical. Thus, the part of the positioning of the cursor which does not change for as long as the cursor remains within the region, will not change either when the boundary is crossed.

A further embodiment of the image display device in accordance with the invention is characterized in that the cursor control means are arranged to display the cursor as a pair of intersecting hairlines, the hairlines extending along respective paths which are followed by the cursor in response to a continued change of the adjustment with the first sign and the second sign, respectively. The hairlines of the cursor thus serve also to indicate the locations which can be reached by changes of adjustment in one direction.

BRIEF DESCRIPTION OF THE DRAWINGS

The invention will be described in detail hereinafter with reference to some Figures; therein.

DETAILED DESCRIPTION OF THE PREFERRED EMBODIMENTS

Figure 1:
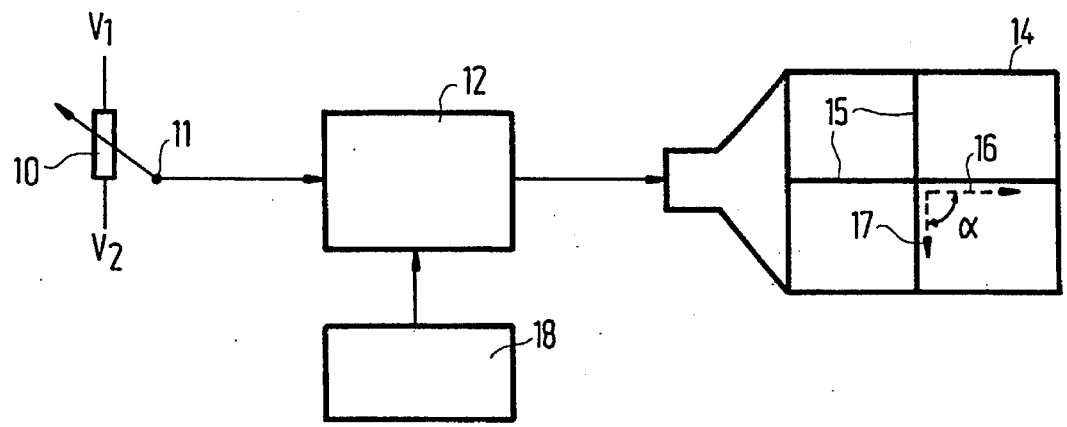
FIG. 1 shows an interactive image display device.

FIG. 1 shows an interactive image display device. It comprises a control means 10, represented as an adjusting potentiometer, cursor control means 12, and a display screen 14. The Figure also shows image generating means 18. The control means 10 is coupled to an input of the cursor control means 12. The output of the cursor control means 12 is coupled to an input of the display screen 14.

On the display screen 14 there is indicated a cursor 15 which consists of two hairlines. On the screen there are also indicated two directions 16, 17 which enclose an angle α of approximately 90° relative to one another.

The interactive image display device can serve, for example as a personal computer in which a variety of data, for example arranged as text, is displayed on the screen, or as a route planner in which case a map can be displayed on the screen. The exact function of the device will not be elaborated upon herein.

During use, the cursor control means 12 ensure that an image generated by the image generating means 18 is displayed on the screen 14, together with the cursor 15. The cursor can be displayed as hairlines or as an arrow or any other symbol indicating a location. The location of the cursor 15 on the screen is controlled on the basis of the adjustment of the control means 10. The user can change the adjustment of this control means 10. Let the adjustment be represented by a number N (when the control means 10 is a rotary potentiometer, the number N may be, for example the number of degrees wherethrough the rotary potentiometer has been rotated). When the cursor control means 12 detect that the number N increases, they displace the cursor in a first direction 16 on the screen. When a decrease of the number N is detected, the cursor is displaced in a second direction 17. When the user has thus moved the cursor to a desired location, the cursor location can be confirmed, for example by closing a switch provided for this purpose. This switch may be provided, for example on the rotary knob so as to detect pulling out or pushing in of the rotary knob transversely of the direction of rotation. The user can then execute the confirmation by pushing in or pulling out the knob.

The essence of the invention consists in that the cursor movements are irreversible in the following sense. When the adjustment of the control means is first changed with a first sign, the cursor follows a first path. When subsequently the adjustment of the control means is changed with an opposite sign, the cursor follows a second path. The second path is not a reversal of the first path: the cursor passes through locations along the second path which do not belong to the first path. The cursor location can thus be moved across a two-dimensional region by combinations of adjustment changes of the control means.

Figure 2:
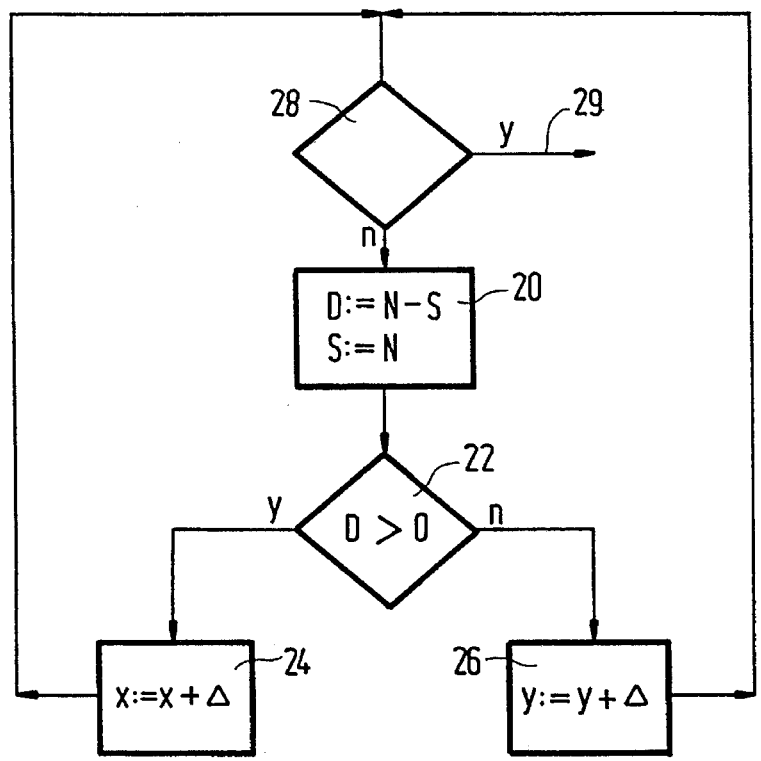
FIG. 2 shows a flow chart for controlling an interactive image display device in accordance with the invention.

FIG. 2 shows a flow chart illustrating this cursor control. For this flow chart it is assumed that the variable N contains the adjustment of the adjusting means 10 and that the location of the cursor 15 on the screen 14 is controlled by the variables X and Y. The variable S contains a first adjustment of the adjusting means 10. During a first step 20 after the start ST in the flow chart, the difference N-S between the current adjustment and the previous adjustment is determined and assigned to the variable D. The current adjustment is subsequently saved in the variable S. During a next step 22, a test 22 is performed on the basis of the sign of D. If D>0, the variable X is incremented (24) by the value of D, so that the cursor is moved to the fight. If D<0, the variable Y is decremented (26) by adding D thereto, so that the cursor is moved downwards. Subsequently, there is a test 28 of the confirmation of the indicated XY values, for example by testing whether a switch has been closed for confirmation. In that case the program is terminated via an exit 29 and the indicted XY values are passed on for further processing in the device. If the XY value is not confirmed, the entire process is repeated so as to control the subsequent displacements of the cursor 15.

Figure 3:
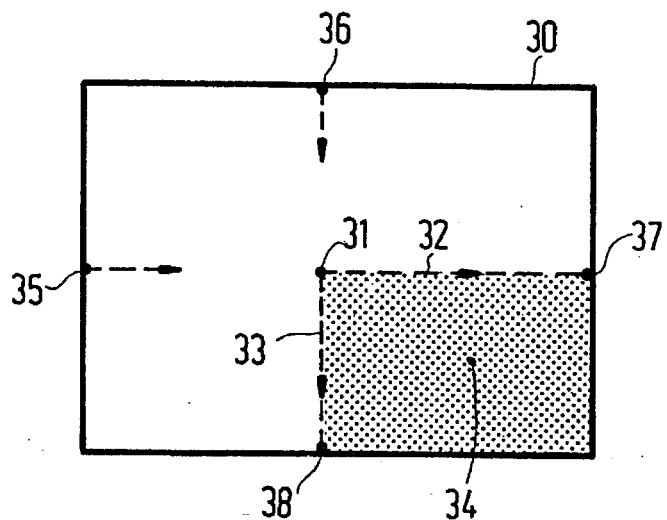
FIG. 3 shows directions of cursor movements on a display screen.

FIG. 3 shows diagrammatically the screen 30 and thereon the directions 33, 34 of cursor movements. As has already been described, only movements to the fight (32) and downwards (33) are possible. Thus, from an initial cursor location 31 $X_0$, $Y_0$ only the locations X, Y ($X>X_0$ or $X=X_0$ and $Y=Y_0$ or $Y<Y_0$) can be reached in the region 34 to the bottom right of the initial location. Preferably, the cursor location is initialized in the top left-hand corner when use commences, so that the entire screen can be reached. After a few cursor movements, however, only a sub-region 34 can still be reached.

In order to enable also other locations on the screen to be reached, it is advisable to couple the cursor "end around": when the cursor reaches a "point of disappearance" 37 (coordinates M, $Y_0$) at the edge of the screen (or of a sub-region of the screen), the cursor is displaced to an oppositely situated "point of appearance" 35 (coordinates $0,Y_0$). From that point the cursor can move further to the fight and downwards again, so that the entire lower pan of the screen 30 is accessible. Preferably, the point of appearance 35 whereto the cursor is displaced is chosen so that from this point the point of disappearance 37 can be reached again by changing the adjustment N of the adjusting means 10 continuously with the same sign (in the example in that the point of appearance 35 has the same Y coordinate as the point of disappearance 37). A similar end-around coupling of a point of disappearance 38 to an oppositely situated point of appearance 36 can be used for the movements in the other direction 33.

Figure 4:
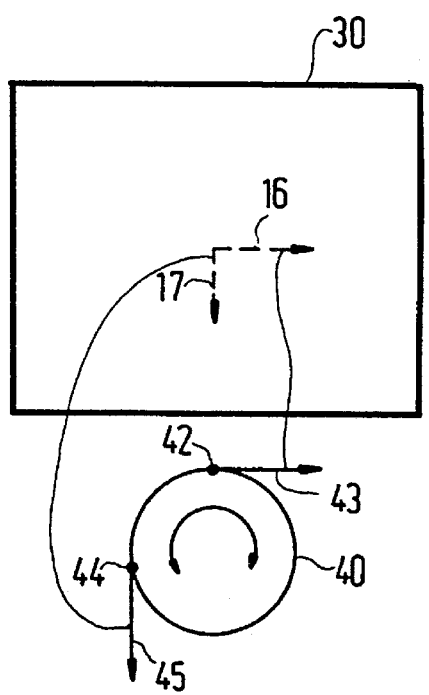
FIG. 4 shows the correspondence between movements of a rotatable knob and movements of the cursor.

FIG. 4 illustrates an attractive correspondence between movements of a rotatable knob 40 and directions of movement 16, 17 of the cursor. For the adjusting means 10 use is preferably made of a rotatable knob 40 without a stop, i.e. a knob which can rotate an unlimited number of times clock-wise and counter-clockwise. Thus, the cursor cannot become stuck somewhere on the screen because the rotatable knob runs against a stop. The axis of the knob preferably extends perpendicularly to the screen. The movement directions 16, 17 on the screen correspond, viewed from the position of observation of the user, to the movement directions 43, 45 of two points 42, 44 on the rotatable knob 40. This imparts the user with the sensation as if the rotatable knob 40 is situated to the bottom fight of the cursor and takes along the cursor during its rotation.

The invention can be used for a variety of cursor control applications, for example for effective continuous control problems such as the indication of a position on a map. In another example, the invention can be used for the control of discrete cursor locations, for example for the selection of an option from a two-dimensional menu as follows:

| Q | W | E | R |
|---|---|---|---|
| A | S | D | F |
| Z | X | C | V |

The change of the cursor location is not continuous but step-wise in this case: the device changes the cursor location to the location of a next menu option when the rotation D of the knob exceeds a threshold. The jump direction (horizontal or vertical) is dependent on the sign of the change of the rotation.

The invention has been described on the basis of movements to the fight and downwards. For readers in the western world, who read from left to fight and from the top downwards, this is the intuitively most natural direction of displacement of the cursor. Other combinations of displacement directions, however, are also possible, for example upwards and to the left or downwards and to the left (notably for cultures having another direction of writing). Combinations of directions which do not enclose an angle of 90 degrees relative to one another are also feasible. In the latter case it is advisable to display also the hairlines of the cursor at this angle in such a way that they reveal to the user which locations can be reached by changing the adjustment of the control means 10 in one direction. Furthermore, it is also possible to render the direction dependent on the magnitude of the change of adjustment. It is important only that at least for some, mutually cancelling changes of the adjustment of the control means the resultant cursor movements are not the reverse of one another.

Furthermore, the invention is not restricted to movements of the cursor which take place in the same direction in all locations on the screen. For example, when use is made of pole coordinates, a change of the adjustment of the rotary knob in one direction may lead to a circular movement around a centre, and a change of the adjustment in another direction may cause radial movements to or from the centre.

For the control means 10 use is preferably made of a rotatable knob without a stop. For the sensor use can be made of a potentiometer, but mechanisms which do not perform an absolute rotary measurement but measure only the change of the adjustment angle are also suitable; in that case the variable "D" is available on the output of the control means. A three-position knob can also be used as a control means. The extreme positions then serve, for example for starting a movement in the upwards direction and to the right, respectively, which movement continues (at a uniform speed or in an accelerating fashion) until the knob is set to the central position which serves as a rest position.

What is claimed:

1. An interactive image display device, comprising a display screen and a single cursor control means for controlling a movement of the cursor on the screen, the single cursor control means being adapted to move in a first direction and a second opposite direction to realize the movement of the cursor in a direction of a first coordinate axis or a second coordinate axis intersecting with the first coordinate axis on the screen, movement of the single cursor control means in the first direction causing the cursor to move in the direction of the first coordinate axis and movement of the single cursor control means in the second opposite direction causing the cursor to move in the direction of the second coordinate axis.

2. An interactive image display device as claimed in claim 1, characterized in that the directions of the first and the second coordinate axis intersect at an angle of substantially 90 degrees.

3. An interactive image display device as claimed in claim 1, characterized in that the control means comprises a rotatable knob which is rotatable in mutually opposed directions for adjustment.

4. An interactive image display device as claimed in claim 2, characterized in that, viewed from the normal position of use, counter-clockwise and clockwise rotations of the knob correspond to movements of the cursor in the downwards direction and to the right, respectively.

5. An interactive image display device as claimed in claim 1, characterized in that it is arranged to move the cursor, when it reaches a first point of intersection with a first boundary of a predetermined region on the screen during movement, to a second, other point of intersection on an opposite second boundary.

6. An interactive image display device as claimed in claim 5, characterized in that the second point of intersection is chosen so that the movement of the cursor is cyclical.

7. An interactive image display device as claimed in claim 1, characterized in that the cursor control means are arranged to display the cursor as a pair of intersecting hairlines, the hairlines extending along respective paths which are followed by the cursor in response to a continued change of the adjustment with the first sign and the second sign, respectively.

8. An interactive image display device as claimed in claim 2, characterized in that the control means comprises a rotatable knob which is rotatable in mutually opposed directions for adjustment.

9. An interactive image display device as claimed in claim 3, characterized in that, viewed from the normal position of use, counter-clockwise and clockwise rotations of the know correspond to movements of the cursor in the downwards direction and to the right, respectively.

10. An interactive image display device as claimed in claim 2, characterized in that it is arranged to move the cursor, when it reaches a first point of intersection with a first boundary of a predetermined region on the screen during movement, to a second, other point of intersection on an opposite boundary.

\* \* \* \* \*